United States Patent

Schultz

[15] 3,702,415
[45] Nov. 7, 1972

[54] SAFETY AUTOMOTIVE LIGHTING CIRCUITS

[72] Inventor: Rudd Schultz, 611 S. E. 18th Avenue, Pompano Beach, Fla.

[22] Filed: April 28, 1971

[21] Appl. No.: 138,127

Related U.S. Application Data

[63] Continuation-in-part of Ser. No. 33,645, May 1, 1970, abandoned.

[52] U.S. Cl. ..................................315/82, 315/83
[51] Int. Cl. ....................................B60g 1/02
[58] Field of Search ..........................315/82, 83

[56] References Cited

UNITED STATES PATENTS 3,341,736  9/1967  Fortney ..................315/82
3,021,449  2/1962  Kerr et al. ..............315/83
3,355,624  11/1967  Guyton et al. ........315/83
3,206,637  9/1965  Finken ...................315/83

FOREIGN PATENTS OR APPLICATIONS 682,639  3/1964  Canada ....................315/82

*Primary Examiner*—Nathan Kaufman
*Attorney*—Settle & Oltman

[57] ABSTRACT

An improved circuit in an automotive vehicle associated with the light switch and the ignition switch of the vehicle to turn on the vehicle's headlamps along with or instead of its parking lamps when the light switch is in its parking lamp activating position and the vehicle is in an operating condition.

11 Claims, 3 Drawing Figures

INVENTOR.
RUDD SCHULTZ.
BY Settle & Oltman
ATT'Y.S.

SAFETY AUTOMOTIVE LIGHTING CIRCUITS

RELATED DISCLOSURE

This application is related to U.S. Pat. No. 3,500,120 issued to the present inventor on Mar. 10, 1970.

This application is a continuation-in-part of patent application Serial No. 33,645 filed May 1, 1970 by the present inventor and now abandoned.

BACKGROUND OF THE INVENTION

The above-identified patent discloses and claims crossover circuitry associated with the ignition switch and light switch of an automotive vehicle for switching from parking lamps to head-lamps when the ignition switch is on at a time when the parking lamps are activated. The circuitry may be utilized along with or separately from an interlock circuit which prevents the wind-shield wiper of the vehicle from being turned on without also turning on the headlamps of the vehicle in at least one operating condition of the vehicle.

SUMMARY OF THE INVENTION

The crossover circuits of this application turn on the headlamps of the vehicle when the vehicle is operative at a time when the parking lamps are activated and this is accomplished with a switching means and a circuit path from the park position of the light switch to the headlamps which bypasses a path including further switching means. With this arrangement, the cross-over action which turns on the headlamps can be accomplished without extinguishing the parking lamps, the extinguishing of parking lamps being an optional feature. Other lamps may be controlled the same way.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
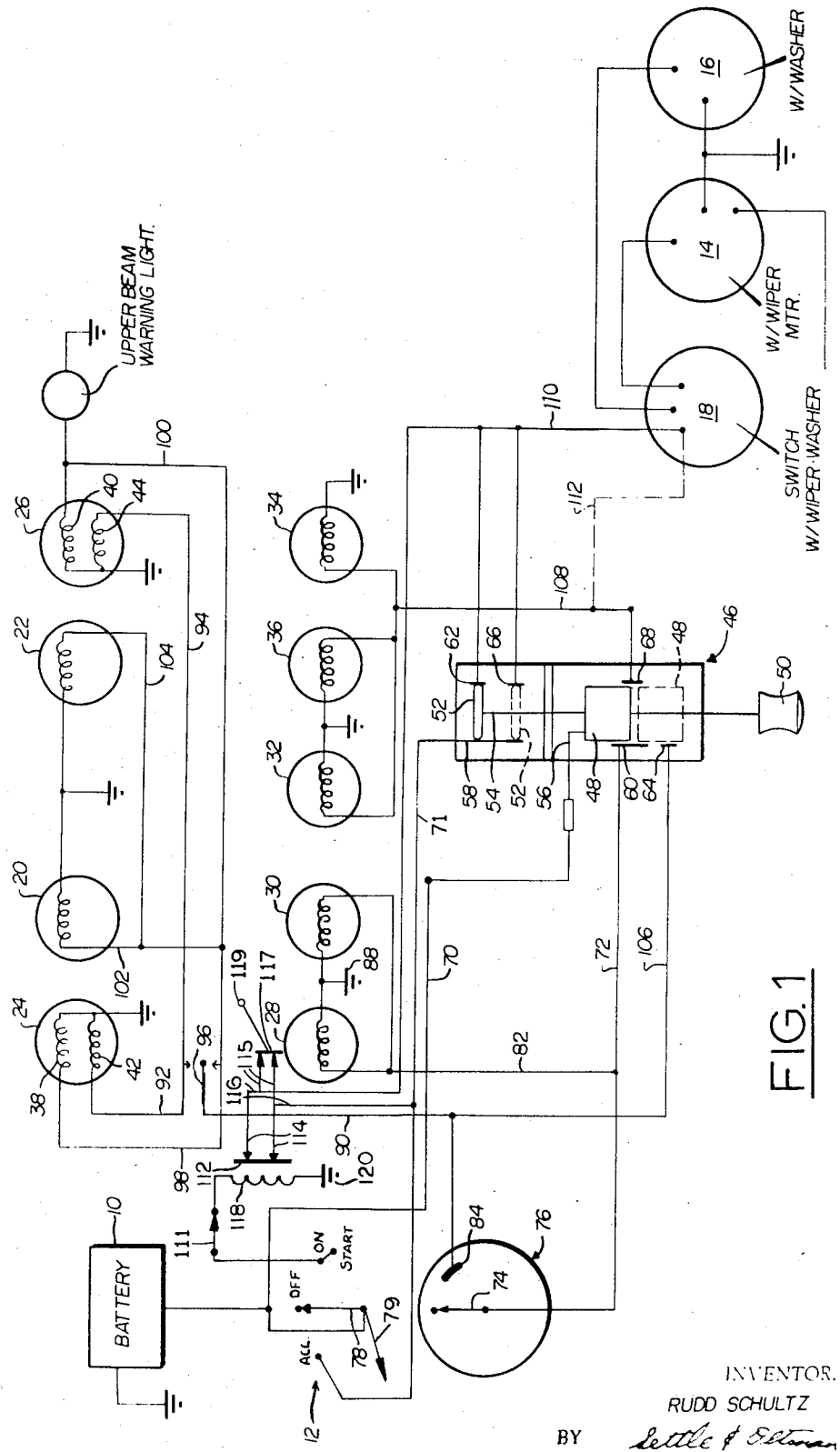
FIG. 1 is a circuit diagram for part of an electrical system of an automotive vehicle including a crossover circuit in accordance with one embodiment of the invention.

Since the electrical system of FIG. 1 is related to an embodiment disclosed in the above-identified patent, part of the description from the patent will be incorporated herein as follows.

The system of FIG. 1 includes a battery 10, an ignition lock switch 12, an electrical motor 14 for driving the windshield washer 16, and a control switch 18 for controlling the motor 14 and washer 16. These elements are standard parts of automotive vehicles at the present time, and need not be illustrated in detail. The electrical system has several lamps including upper beam head lamps 20 and 22, lower beam head lamps 24 and 26, parking lamps 28 and 30, tail lamps 32 and 34, and a license light 36. The lower beam head lamps 24 and 26 have low beam filaments 38 and 40, and also have upper beam filaments 42 and 44 for operation in conjunction with the upper beam head lamps 20 and 22. All of these lamps are also standard elements in automotive vehicles at the present time.

A light switch 46 is provided which is modified somewhat as compared to the standard light switch in present day automotive vehicles. Light switch 46 includes a movable contactor 48 operable reciprocably by pulling or pushing a knob 50. The movable contactor 48 is connected to an auxiliary contactor 52 by any suitable connection 54 so that the two contactors move together. The contactor 52 is part of the interlock contacting means provided in accordance with the invention.

The contactors 48 and 52 have an off position, a parking lamp activating position, and a head lamp activating position. The contactors are shown in FIG. 1 in the parking lamp activating position, and they can be moved together to the head lamp activating position shown in dashed lines by pulling on the control knob 50. The contactors 48 and 52 can also be moved rearwardly to an off position (not shown) by pushing on the control knob 50. In all positions of the contactors 48 and 52, they are in electrical contact respectively with slide contacts 56 and 58. Separate contacts can be used rather than slide contacts so that contactors 48 and 52 are isolated at the off position. When contractors 48 and 52 are in the parking lamp activating position, contactor 48 is in electrical contact with a fixed switch contact 60, and contactor 52 is in electrical contact with a fixed switch contact 62. When the contactors 48 and 52 are in the head lamp activating position, contactor 48 is in electrical contact with fixed switch contacts 60 and 64, and contactor 52 is in electrical contact with a fixed switch contact 66. In both the parking lamp and head lamp activating positions, contactor 48 is in electrical contact with fixed switch contacts 60 and 68.

The slide contacts 56 and 58 are connected to lines 70 and 71. Fixed contact 60 is connected by line 72 to the movable contact 74 of a switch 76 which is either associated with the ignition switch 12 of the vehicle or a separate switch. The movable contact 74 of the switch 76 and the movable contact 78 of ignition switch 12 each has an accessory position, and off position, an on position, and a start position as indicated on ignition switch 12. The start position is optional. The connections for the ignition switch 12 are standard and so are not illustrated herein. The connections for switch 76 are illustrated in FIG. 1.

Switch 76 has a fixed contact 84 either at only the on position, or bridging the on and start positions if the switch is associated with ignition switch 12. Fixed contact 84 is connected to a line 90 which leads to the head lamps 20, 22, 24 and 26. Line 90 is connected by branch lines 92 and 94 to the low beam filaments 42 and 44. Line 90 is connected through a foot switch 96 to branch lines 98 and 100 which lead to the high beam filaments 38 and 40, and also to branch lines 102 and 104 which lead to the high beam head lamps 20 and 22.

Returning to the light switch 46, the fixed contact 64 for the head lamp activating position of the lamp switch is connected by a line 106 to line 90 which, as previously described leads to the head lamps. The fixed contact 68 is connected by line 108 to the tail lamps 32 and 34 and the license plate lamp 36. The fixed contacts 62 and 66 are both connected by line 110 to the control switch 18 for controlling the windshield wiper motor 14 and the washer 16. It may be seen that line 110 is the only power supplying line leading to control switch 18, and this means that control switch 18 cannot be operated to turn on the motor 14 unless contactor 52 is in either the parking lamp activating position or the head lamp activating position.

Referring now to the differences between the circuit of FIG. 1 and that of U.S. Pat. No. 3,500,120, it may be noted that the switch 76 has no fixed contacts at the accessory and off positions, and there are no connections between the switch 76 and the parking lamps 28 and 30 of the vehicle. Instead, there is a bypass circuit path 82 leading from line 72 to the filaments of the parking lamps 28 and 30. The circuits path 82 bypasses the path including the switch 76.

If the switch contact 74 is in the off position, current is supplied from the battery 10 through line 70, slide contact 56, contactor 48, fixed contact 60, line 72, line 82 and parking lamps 28 and 30 to ground at 88, thus lighting the parking lamps. When ignition switch is in either the on or accessory position, current is also supplied from battery 10 through line 71, contact 58, contactor 52, contact 62 and line 110 to the control switch 18. This means that the control switch 18 is enabled so that it can be operated to turn on the windshield wiper motor 14.

As previously mentioned, it is desirable to have the head lamps of the vehicle turned on when the ignition switch 12 and the associated switch 76 are turned to "on" position, even though the light switch 46 is in the parking lamp activating position. When the ignition switch 12 is "on", the movable contactor 74 of switch 76 closes fixed contact 84, so current is supplied from line 72 through contacts 74 and 84 to line 90 which leads to the head lamps. The head lamps are thus energized, the particular head lamps depending on whether foot switch 96 is in the low beam activating position or the high beam activating position.

When the head lamps are turned on, the parking lamps 28 and 30 are not extinguished. This is because circuit path 82 bypasses switch 76, so a path for current flow to the parking lamps is maintained when the ignition switch 12 and switch 76 are turned to the "on" position. Note that switch 76 could be disconnected from switch 12 and operated manually and independently. Switch 76 can be operated by the gear shift lever such that the switch is in the "on" position in all conditions of he gear shift lever except the park position.

If switch 46 is turned to the "off" position and the ignition switch 12 is turned to the park position, it is desirable to be able to operate the windshield wiper motor 14 by means of switch 18. To this end, normally closed contacts 112 and 114 of a relay are connected in a line 116 which is connected between line 70 and line 110 bypassing the light switch 46. The coil 118 of the relay is connected from "on" position of ignition switch 12 to ground at 120. Switch 111 is operated by the gearshift lever and is closed in all conditions of the gearshift lever except the park position. In this park position, the windshield wipers may be operated without turning on the headlamps because contacts 112, 114 are closed. Assuming that the ignition switch is in the accessory position, contacts 112 and 114 complete line 116 around light switch 46 so that the windshield wiper can be operated by turning on control switch 18. This condition is not possible when the ignition is on, because when the ignition switch 12 is the "on" position, current is supplied from the battery 10 through contactor 78 and coil 118 to open contacts 112 and 114, thus open-circuiting the bypass path around switch 46. With the ignition switch on, the windshield wiper motor 14 cannot be energized by operating the control switch 18 without turning on either the parking lamps or the head lamps.

It may be noted that when switch 46 is changed to the head lamp activating position, the parking lamps remain on because contactor 48 remains in contact with fixed contact 60.

Contacts 115 parallel contacts 114. The movable contact 117 is normally open. Movable contact 117 may be connected to the gearshift lever 119 of the vehicle such that only when this lever is in its park position is contact 117 closed across contacts 115. Thus, in the park condition of the transmission, the windshield wipers may be operated without turning on the headlamps because the bypass path around switch 46 is completed with the ignition in either the on position or the accessory position.

A movable contact 79 of ignition switch 12 supplies voltage to the accessory system through the accessory position of switch 12 when the ignition is on.

Figure 2:
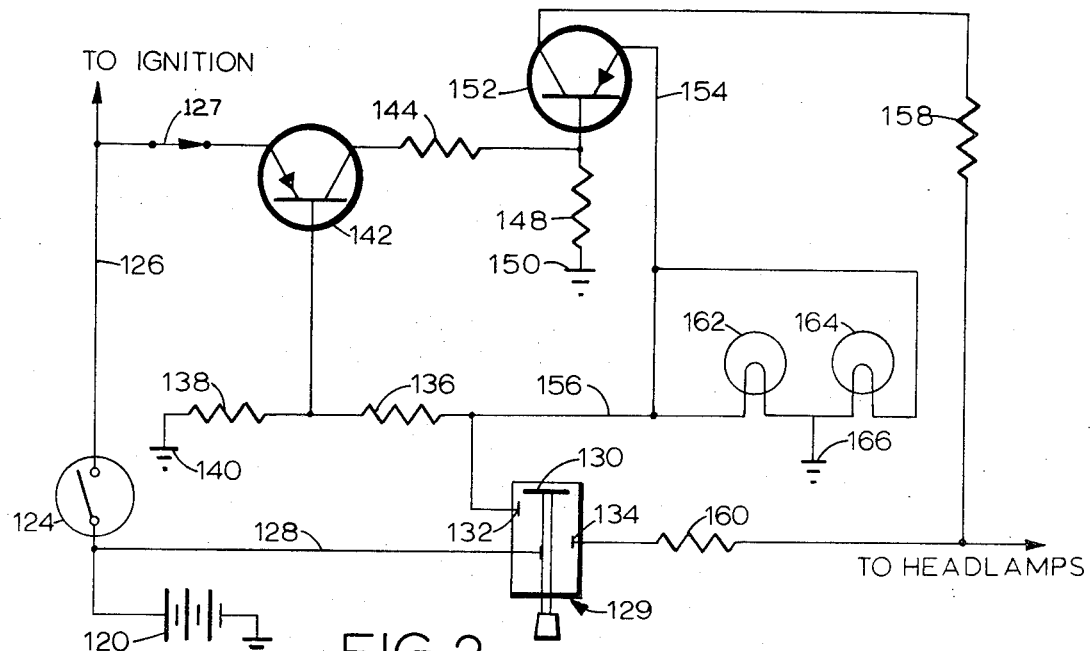
FIG. 2 is a circuit diagram for part of an electrical system showing a crossover circuit in accordance with another embodiment of the invention.

FIG. 2 schematically illustrates another embodiment of the invention. In this electrical system, the battery 120 of the vehicle is connected to a conventional ignition switch 124 and line 126 to the ignition system of the vehicle. The battery 120 is also connected by line 128 to the movable contactor 130 of a light switch 129. The light switch 129 has a fixed contact 132 at a parking lamp activating position and another fixed contact 134 at a headlight activating position, the switch 129 being initially shown in an off position.

Contact 132 is connected by voltage dividing resistors 136 and 138 to ground at 140, and the junction between resistors 136 and 138 is connected to a base of a transistor 142. The emitter of this transistor is connected through switch 127 to line 126, and the collector is connected via resistors 144 and 148 to ground at 150. The junction between resistors 144 and 148 is connected to the base of another transistor 152. Switch 127 is operated by the gearshift lever and is closed in all conditions of that lever except the park condition.

The emitter of transistor 152 is connected via lines 154 and 156 to contact 132, and the collector is connected through resistor 158 to the head lamps of the vehicle (not shown). The fixed contact 134 at the head lamp activating position of switch 129 is also connected through resistor 160 to the head lamps (not shown). Lines 154 and 156 are connected to the parking lamps 162 and 164, the filaments of which are grounded at 166.

With both the ignition switch 124 and the light switch 129 in their off positions as shown, and with switch 127 closed, the transistors 142 and 152 are non-conductive. By moving the switch 129 to the parking lamp activating position so that contact 130 closes contact 132, current can flow from the battery 120 through lines 128 and 156 to the parking lamps 162 and 164 to light them. If the ignition switch 124 is then turned on, the crossover circuitry operates to turn on the headlamps while leaving the parking lamps on. This is accomplished in the following manner.

Current flows from battery 120 through line 128, contact 130, contact 132, resistor 136 and resistor 138 to ground at 140, so the base of transistor 142 is somewhat above ground potential due to the voltage dividing action of resistors 136 and 138. When switch 124 closes, the emitter of transistor 142 is raised to a potential more positive than the base, so transistor 142 becomes conductive. Current flowing through resistors 144 and 148 biases the base of transistor 152 positive relative to its collector. An even more positive potential is applied to the emitter of transistor 152 through lines 156 and 154, so transistor 152 also becomes conductive. Current then flows through transistor 152 and resistor 158 to the head lamps of the vehicle to turn them on. The parking lamps 162 and 164 remain on. If switch 129 is then moved to the head lamp activating position, contact 130 and 132 are opened turning off parking lamps 162 and 164 and also turning off transistors 142 and 152, but current then flows from line 128 through contacts 130 and 134 and resistor 160 to the head lamps keeping them energized.

Figure 3:
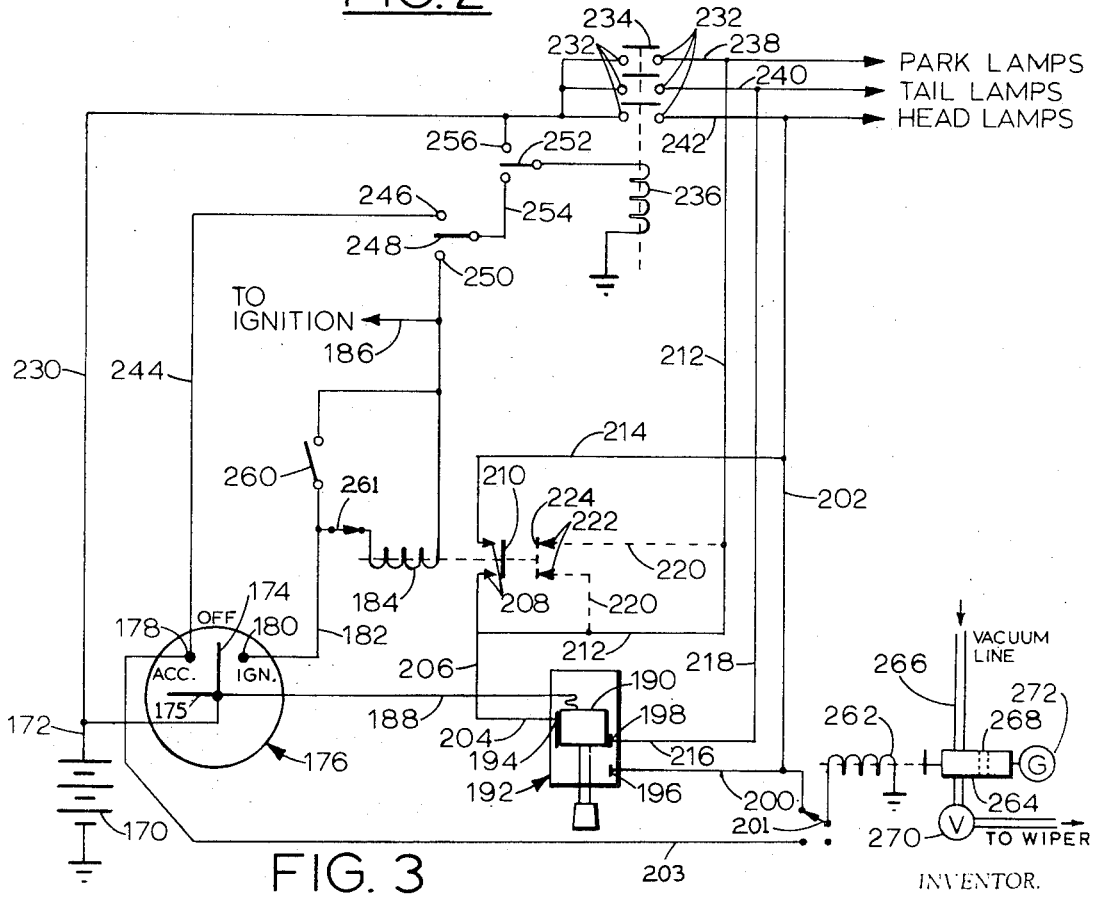
FIG. 3 is a circuit diagram for part of an electrical system showing a crossover circuit in accordance will still another embodiment of the invention.

FIG. 3 illustrates still another embodiment of the invention. In this embodiment, the battery 170 of the electrical system of the vehicle is connected by line 172 to the movable contractor 174 of an ignition switch 176. The switch 176 has accessory, off and ignition positions with contacts 178 and 180 being provided respectively at the accessory and ignition positions. Contact 180 at the ignition position is connected by line 182 and switch 261 through the coil 184 of a relay and line 186 to the ignition system of the vehicle (not shown). Coil 184 could be connected from line 182 to ground. Switch 261 is operated by the gearshift lever and is closed in all conditions of that lever except the park condition.

From movable contractor 174 of switch 176, a line 188 is connected to the movable contractor 190 of a light switch 192. The switch 192 has a fixed contact 194 at a parking lamp activating position (in which position the switch is shown), and another fixed contact 196 at a head lamp activating position. A fixed contact 198 and also contact 194 are closed by movable contractor 190 in both the parking lamp and head lamp positions of the switch 192. Contact 196 is connected by lines 200 and 202 to the head lamps of the vehicle (not shown). Contact 194 for the parking lamp position of switch 192 is connected via lines 204 and 206 through normally open contacts 208 and 210 of the relay 184 and line 214 to the head lamps of the vehicle. Line 206 is connected by a bypass circuit path 212 to the parking lamps (not shown). Contact 198 of switch 192 is connected by lines 216 and 218 to the tail lamps of the vehicle.

Switch 176 is shown in the off position, and switch 192 is shown in the parking lamp activating position. Assume switch 261 is closed. In this condition, current is supplied from the battery through line 172, line 188, contact 194, line 204, line 206 and line 202 to the parking lamps to turn them on. If the movable contactor 174 of switch 176 is then turned to the ignition-on position, current flows from line 172 through movable contactor 174, fixed contact 180, line 182, relay coil 184 and ignition line 186 to a remote ground, thus closing relay contacts 208 and 210. This completes circuit path 214 so that current can also flow from line 206 through line 214 to the head lamps of the vehicle. Thus, when the ignition switch is turned on, the head lamps of the vehicle are turned on even though the light switch 192 remains in a parking lamp activating position. It may be noted that the switching means which accomplishes crossover when the ignition is turned on is in this case a relay, a first portion of which is in the form of relay contacts 208 and 210 in lines 206, 214, and a second portion of which is coil 184 which is connected to the battery via ignition switch 176.

As an additional feature, it may be noted that the battery 170 is connected through line 172 and line 230 to contacts 233 and 234 of a time delay relay having a coil 236. Contacts 232 are connected by lines 238, 240 and 242 to the parking lamps, tail lamps and head lamps of the vehicle.

Contact 178 of switch 176 is connected by line 244 to a fixed contact 246 of a circuit selector having a movable contact 248. The circuit selector has another fixed contact 250 connected to coil 184. Another circuit selector has a movable contact 252 connected to the relay coil 236, and contact 252 is engageable with a fixed contact 254 or another fixed contact 256.

The circuitry just described is provided as an optional on-off control for controlling all of the lamps of the vehicle simultaneously without operation of the light switch 192. If movable contactor 252 is moved into contact with fixed contact 256, relay coil 236 is energized to close contacts 232 and 234 and thus turn on all of the lamps of the vehicle. Alternatively, if movable contactor 248 closes fixed contact 246 and movable contactor 174 closes fixed contact 178 in the accessory position of switch 176, movable contactor 152 can then be closed with fixed contact 254 to energize relay coil 236 and close contacts 232 and 234 to turn on all of the lamps of the vehicle. If movable contact 248 closes contact 250, on the other hand, switch 260 should be closed to bypass relay 184. If contactor 174 is then moved to the ignition position, current flows through line 182, switch 260, contact 250, contact 254, contact 252 and relay coil 236 to close contacts 232 and 234 and thus turn on all of the lamps of the vehicle. It is apparent that alternate means are provided for on-off control of the lamps of the vehicle.

The embodiment of FIG. 3 includes an optional means for extinguishing the parking lamps when crossover from parking lamps to headlamps takes place. In this case, line 212 is replaced by line 220, and contacts 222 and 224 for relay 184 are provided in line 220. With this arrangement, when relay coil 184 is energized, contacts 208, 210 close to turn on the head lamps and contacts 222, 224 open to turn off the parking lamps.

Also shown is an interlock which prevents the windshield wipers of the vehicle from being operated without turning on the head lamps of the vehicle. With switch 201 closed to line 200, coil 262 of solenoid valve 264 is energized whenever the head lamps are energized. This moves valve 264 to line up passage 268 with vacuum line 266, thus completing the vacuum line to control valve 270. Control valve 270 is then operative to actuate a vacuum operated type of windshield wiper. The valve 264 may also be connected to the gearshift lever, if desired, so that when the gearshift is in park and/or neutral position it is effective to open valve 264. This makes valve 270 operative in the park and neutral positions even if the headlamps are off, but in the drive positions, valve 270 becomes operative to control the windshield wiper only when the head lamps are turned on. The same type of gearshift control can be utilized to control switching contacts such as contacts 112, 114 in FIG. 1, if desired.

Switch 201 is operated by the gearshift lever and is closed to line 200 in all positions of that lever except the park position where it closes to line 203. When switch 201 is closed to line 203 and the ignition switch is in either the on position or the accessory position, current is supplied through line 203 to coil 262 which then opens valve 268 so that the windshield wiper can be turned on without turning on the headlamps. Switch 261 is also open so that the crossover circuit is disabled.

Thus the invention provides crossover circuitry with switching means having a first portion connected in an operative path to the head lamps of the vehicle, and a second portion connected to the battery and operable to close the first portion of the switching means only when the ignition of the vehicle is turned on. A wiring connection for the parking lamps of the vehicle bypasses the path including the switching means. When the light switch of the vehicle is in its parking lamp activating position and the ignition means is on, the head lamps are energized.

Having thus described my invention, I claim:

1. In an electrical system for an automotive vehicle having a battery, ignition means, head lamps and parking lamps together with a light switch having an off position, a parking lamp activating position and a head lamp activating position, said light switch having a movable contactor and first and and second pairs of fixed contacts respectively for said parking lamp activating position and said head lamp activating position, a first wiring connection to said first fixed contacts between said battery and said parking lamps, and a second wiring connection to said second fixed contacts between said battery and said head lamps, the combination therewith of further switching means having fixed contact means connected in an operative path between said battery and said head lamps for energizing and deenergizing the same, said further switching means having a second active portion operable to close said fixed contact means, said first wiring connection for said parking lamps bypassing the path including said further switching means, so that when said light switch is in said parking lamp activating position and said active switch portion is actuated to close said fixed contact means, the headlamps are energized even though the light switch is in the parking light activating position.

2. The combination as claimed in claim 1 in which said further switching means comprises manually operated switch means.

3. The combination as claimed in claim 1 in which said further switching means comprises relay means.

4. The combination as claimed in claim 1 in which said further switching means comprises semiconductor switch means.

5. The combination as claimed in claim 1 in which said first wiring connection is complete when said headlamps are energized by said further switching means so that said parking lamps are also energized.

6. The combination as claimed in claim 1 including means for interrupting said first wiring connection when said headlamps are energized by said further switching means.

7. The combination as claimed in claim 1 including a windshield wiper and a wiper control, and means for activating said windshield wiper through said control only when said head lamps are turned on in at least one operating condition of the vehicle.

8. The combination as claimed in claim 7 in which said windshield wiper control comprises a vacuum valve for a vacuum operated windshield wiper.

9. The combination as claimed in claim 7 in which said windshield wiper control comprises switch means for an electrically operated windshield wiper.

10. The combination as claimed in claim 1 including auxiliary switching means connected between said battery and at least one of said lamps bypassing said light switch and said further switching means providing optional on-off control of said lamp.

11. The combination as claimed in claim 10 in which said auxiliary switching means comprises a time delay relay.

* * * * *